US010632406B2

(12) United States Patent
Sugio et al.

(10) Patent No.: US 10,632,406 B2
(45) Date of Patent: Apr. 28, 2020

(54) OIL SEPARATOR, AND SYSTEM FOR SEPARATING OIL FOR VEHICLE

(71) Applicant: NABTESCO AUTOMOTIVE CORPORATION, Tokyo (JP)

(72) Inventors: Takuya Sugio, Tokyo (JP); Hiroaki Kawanami, Tokyo (JP); Ichiro Minato, Tokyo (JP)

(73) Assignee: NABTESCO AUTOMOTIVE CORPORATION, Tokyo (JP)

(*) Notice: Subject to any disclaimer, the term of this patent is extended or adjusted under 35 U.S.C. 154(b) by 327 days.

(21) Appl. No.: 15/313,471

(22) PCT Filed: May 26, 2015

(86) PCT No.: PCT/JP2015/065033
§ 371 (c)(1),
(2) Date: Nov. 22, 2016

(87) PCT Pub. No.: WO2015/182584
PCT Pub. Date: Dec. 3, 2015

(65) Prior Publication Data
US 2017/0182441 A1   Jun. 29, 2017

(30) Foreign Application Priority Data

May 27, 2014   (JP) .................................. 2014-109129

(51) Int. Cl.
*B01D 45/08* (2006.01)
*B60T 17/00* (2006.01)
(Continued)

(52) U.S. Cl.
CPC ......... *B01D 45/08* (2013.01); *B01D 46/0031* (2013.01); *B60T 17/00* (2013.01);
(Continued)

(58) Field of Classification Search
None
See application file for complete search history.

(56) References Cited

U.S. PATENT DOCUMENTS 4,714,483 A * 12/1987 Koening .............. B01D 53/261
                                                    55/DIG. 17
4,936,026 A *  6/1990 Cramer ................ B60T 17/004
                                                         34/562
(Continued)

FOREIGN PATENT DOCUMENTS

CA     2321556 A1 *  9/1999 ......... B01D 53/0415
JP     S61-1882 A       1/1986
(Continued)

OTHER PUBLICATIONS

International Search Report as issued in International Patent Application No. PCT/JP2015/065033, dated Sep. 1, 2015.
(Continued)

*Primary Examiner* — Amber R Orlando
*Assistant Examiner* — Brit E. Anbacht
(74) *Attorney, Agent, or Firm* — Pillsbury Winthrop Shaw Pittman, LLP

(57) ABSTRACT

An oil separator includes a housing and an impingement member arranged in the housing. The oil separator introduces air containing oil into the housing and causes the air to strike the impingement member to separate the oil from the introduced air, thereby recovering the oil into a liquid storage portion. The oil separator further includes a liquid restoration device that restores collected liquid to an external device. The collected liquid contains the oil that has been separated from the air and recovered. The liquid restoration device includes an inlet port connected to the liquid storage portion, a retaining portion, and a discharge port connected to the external device.

7 Claims, 4 Drawing Sheets

(51) Int. Cl.
   *B01D 46/00*     (2006.01)
   *F04B 39/16*     (2006.01)
   *B60G 17/052*    (2006.01)
   *F04B 39/04*     (2006.01)

(52) U.S. Cl.
   CPC ............ *B60T 17/002* (2013.01); *F04B 39/16* (2013.01); *B60G 17/052* (2013.01); *F04B 39/04* (2013.01)

(56) References Cited

U.S. PATENT DOCUMENTS

| | | | | |
|---|---|---|---|---|
| 6,074,462 | A * | 6/2000 | Quinn | B01D 53/0415 55/DIG. 17 |
| 6,585,806 | B2 * | 7/2003 | Quinn | B01D 53/0415 55/DIG. 17 |
| 2004/0045436 | A1 * | 3/2004 | Quinn | B01D 53/0415 95/121 |
| 2010/0006075 | A1 * | 1/2010 | Ruppel | F01M 13/023 123/573 |
| 2015/0135961 | A1 * | 5/2015 | Sugio | F01N 3/037 96/381 |
| 2015/0152763 | A1 * | 6/2015 | Sugio | B01D 45/08 55/385.3 |
| 2017/0182441 | A1 * | 6/2017 | Sugio | B01D 45/08 |
| 2017/0246568 | A1 * | 8/2017 | Sugio | B01D 45/08 |

FOREIGN PATENT DOCUMENTS

| | | |
|---|---|---|
| JP | S63-157234 U | 10/1988 |
| JP | H08-301100 A | 11/1996 |
| JP | 2013-031798 A | 2/2013 |
| JP | 2013-234632 A | 11/2013 |
| WO | WO 2013/168757 A1 | 11/2013 |
| WO | WO 2013/168758 A1 | 11/2013 |

OTHER PUBLICATIONS

International Preliminary Report on Patentability and the Written Opinion of the International Searching Authority as issued in International Patent Application No. PCT/JP2015/065033, dated Nov. 29, 2016.

* cited by examiner

OIL SEPARATOR, AND SYSTEM FOR SEPARATING OIL FOR VEHICLE

CROSS-REFERENCE TO RELATED APPLICATIONS

This application is the U.S. National Stage of PCT/JP2015/065033, filed May 26, 2015, which in turn claims priority to Japanese Patent Application No. JP 2014-409129, filed May 27, 2014. The contents of these applications are incorporated herein by reference in their entireties.

TECHNICAL FIELD

The present invention relates to an oil separator and an oil separating system for a vehicle that separate oil from air that has passed through equipment.

BACKGROUND ART

Vehicles such as trucks, buses, and construction machines use compressed air delivered by a compressor to control systems such as brakes and suspensions. Compressed air delivered by a compressor entrains water, which is contained in the atmosphere, and oil for lubricating the inside of the compressor. When the compressed air entraining such water and oil enters the systems, it causes rust and swelling of rubber members, resulting in an operational defect of the systems. For this reason, an air dryer is provided downstream of the above-mentioned compressor to remove water and oil from the compressed air.

An air dryer executes a loading mode operation for removing water and oil from compressed air by allowing the compressed air to pass through a desiccant and an unloading mode operation for regenerating the desiccant by ejecting water and oil trapped by the desiccant to the outside. The air ejected from the air dryer during the unloading mode operation entrains water and oil. Thus, considering the burden on the environment, it has been proposed to provide an oil separator for separating and recovering oil from the air ejected from the air dryer.

The oil separator separates gas and liquid by allowing air entraining water and oil to strike impingement members. Such gas/liquid separation causes the air from which water and oil have been removed to be expelled to the outside and the water and oil that have been separated from the air, which is collected liquid, to be recovered in a liquid storage portion in the oil separator (for example, see Patent Document 1).

PRIOR ART DOCUMENT

Patent Document

Patent Document 1: Japanese Laid-Open Patent Publication No. 2013-234632

SUMMARY OF THE INVENTION

Problems that the Invention is to Solve

In the oil separator of Patent Document 1, collected liquid is recovered in the liquid storage portion in the oil separator, and recovery of collected liquid cannot be continued once the amount of recovered liquid reaches the volume of the liquid storage portion. Thus, the collected liquid needs to be periodically recovered from the oil separator. The number of maintenance operations such as above recovery operations is desired to be small. In this regard, an oil separator has been sought that reduces the number of times the separated and stored liquid is recovered. Also, it is desirable that oil separating systems for vehicles have such an oil separator.

Accordingly, it is an objective of the present invention to provide an oil separator and an oil separating system for a vehicle that reduces the number of times separated and stored liquid is recovered.

Means for Solving the Problems

Means for achieving the above objective and advantages thereof will now be described.

To achieve the foregoing objective and in accordance with one aspect of the present invention, an oil separator that includes a housing and an impingement member is provided. The impingement member is arranged in the housing. The oil separator introduces air containing oil into the housing and causes the air to strike the impingement member to separate the oil from the introduced air, thereby recovering the oil into a liquid storage portion. The oil separator further includes a liquid restoration device, which restores, to an external device, collected liquid containing the oil that has been separated from the air and recovered. The liquid restoration device includes an inlet port connected to the liquid storage portion, a retaining portion, which retains the collected liquid that has flowed in through the inlet port, and a discharge port connected to the external device. The liquid restoration device pressurizes the retaining portion to discharge the retained collected liquid to the external device through the discharge port.

With the above configuration, the liquid stored in the liquid storage portion of the oil separator is restored to the external device by the liquid restoration device. That is, the liquid restoration device retains, in the retaining portion, collected liquid from the liquid storage portion of the oil separator via the inlet port, and pressurizes the retaining portion to discharge the collected liquid retained in the retaining portion to the external device via the discharge port. Thus, the collected liquid stored in the liquid storage portion of the oil separator is restored to the external device by the liquid restoration device. This reduces the number of times the stored liquid, which has been separated from air by the oil separator, is recovered.

In the above described oil separator, the liquid restoration device preferably includes a supply port, which supplies compressed air to the retaining portion, a piston arranged in the retaining portion, and an urging spring, which urges the piston toward the supply port. The piston is preferably displaced by the compressed air supplied from the supply port, thereby discharging the collected liquid retained in the retaining portion to the external device through the discharge port.

With the above configuration, compressed air is supplied from the supply port of the liquid restoration device to displace the piston in the retaining portion, so that the liquid retained in the retaining portion is discharged to the external device via the discharge port. Accordingly, the piston, which is displaced by compressed air, reliably discharges the liquid retained in the retaining portion to the external device.

In the above described oil separator, control air, which controls an exhaust valve of an air dryer for drying the compressed air, is preferably supplied to the supply port.

With the above configuration, the control air, which controls the exhaust valve of the air dryer, displaces the piston. Thus, when the governor of the air dryer is activated, the collected liquid is discharged to the external device from the liquid restoration device. Accordingly, the discharge of the collected liquid is executed the same number of times as the ejection from the air dryer.

The above described oil separator preferably includes a valve device, and the valve device is preferably actuated by control air, which controls an exhaust valve of an air dryer for drying compressed air. Dry compressed air is supplied to the valve device from a tank that stores dry compressed air, and the valve device uses the control air to supply the dry compressed air in the tank to the supply port of the liquid restoration device.

With the above configuration, the control air, which controls the exhaust valve of the air dryer, supplies the dry compressed air of the tank into the retaining portion to displace the piston. Thus, compared to a configuration in which the piston is driven solely by the control air, the piston is reliably displaced by a great force.

In the above described oil separator, the liquid restoration device preferably includes a supply port, which supplies compressed air to the retaining portion, and the liquid restoration device preferably uses pressure of the compressed air supplied from the supply port to discharge the collected liquid retained in the retaining portion to the external device through the discharge port.

With the above configuration, compressed air is supplied from the supply port of the liquid restoration device, so that the collected liquid retained in the retaining portion is discharged to the external device via the discharge port. Thus, no actuating structure such as a piston is required, which simplifies the configuration.

In the above described oil separator, control air, which controls an exhaust valve of an air dryer for drying the compressed air, is preferably supplied to the supply port.

With the above configuration, the control air, which controls the exhaust valve of the air dryer, discharges the collected liquid in the retaining portion. Thus, the collected liquid can be discharged to the external device from the liquid restoration device when the exhaust valve of the air dryer is activated, that is, when air entraining oil is introduced to the oil separator from the air dryer. Accordingly, the discharge of the collected liquid is executed the same number of times as the ejection from the air dryer.

In the above described oil separator, air ejected from the oil separator is preferably supplied to the supply port. With the above configuration, the air ejected from the oil separator discharges the collected liquid in the retaining portion. Therefore, the discharge of the collected liquid is performed the same number of times as the ejection of air from the oil separator.

In the above described oil separator, the liquid restoration device preferably includes a heating portion, which heats the collected liquid in the retaining portion, and the collected liquid in the retaining portion is preferably expanded by being heated, so that the retaining portion is pressurized.

With the above configuration, when the retaining portion is pressurized through expansion of the collected liquid in the retaining portion by heating, the collected liquid is discharged to the external device from the liquid restoration device. This allows the collected liquid to be discharged to the external device from the liquid restoration device solely by the heating portion, without providing a supply passage for supplying compressed air to the retaining portion.

The above described oil separator preferably includes a check valve arranged between the liquid storage portion and the inlet port, and the check valve is preferably opened only when causing the collected liquid to flow into the liquid restoration device.

With the above configuration, the check valve, which is arranged between the liquid storage portion and the inlet port, opens only when the collected liquid is delivered to the liquid restoration device. Thus, when the collected liquid is discharged from the discharge port, the collected liquid is prevented from flowing back to the liquid storage portion from the inlet port.

In the above described oil separator, the external device preferably uses oil.

With the above configuration, the liquid stored in the liquid storage portion of the oil separator is consumed in the external device. This minimizes the number of times that the stored liquid, which has been separated from air by the oil separator, is recovered.

To achieve the foregoing objective and in accordance with one aspect of the present invention, an oil separating system for a vehicle is provided that includes an oil separator, which separates oil from air and recovers the oil into a liquid storage portion, and a liquid restoration device, which restores, to an external device, collected liquid containing the oil that has been separated from the air and recovered.

With the above configuration, the collected liquid stored in the liquid storage portion of the oil separator can be restored to the external device by the liquid restoration device. This reduces the number of times that the stored liquid, which has been separated from air by the oil separator, is recovered.

Effects of the Invention

The present invention reduces the number of operations for recovering separated and stored liquid.

MODES FOR CARRYING OUT THE INVENTION

First Embodiment

An oil separator and an oil separating system for a vehicle according to a first embodiment will now be described with reference to FIGS. 1 and 2.

Figure 1:
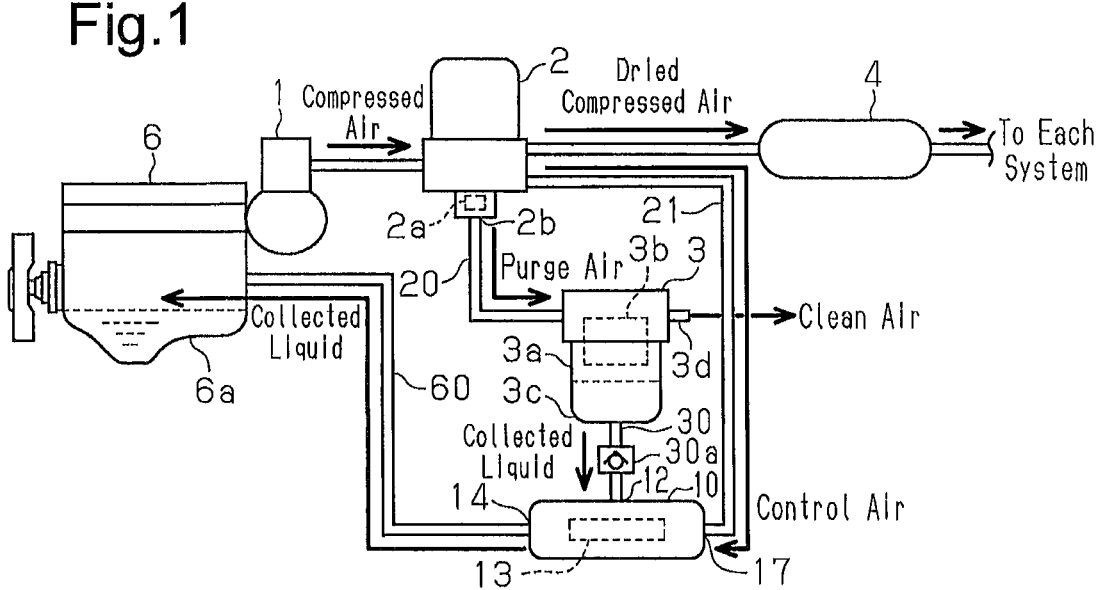
FIG. 1 is a block diagram illustrating an oil separator according to a first embodiment.

As shown in FIG. 1, a vehicle such as a truck, buses, or construction machine use compressed air delivered from a compressor 1 to control systems such as brakes and suspensions. Thus, an air dryer 2, which removes oil and water from compressed air and delivers dried air, is provided downstream of the compressor 1 in an air system. The air dryer 2 incorporates a desiccant. The air dryer 2 executes a loading mode operation for removing water and oil from compressed air by allowing the compressed air to pass through a desiccant and an unloading mode operation for regenerating the desiccant by ejecting water and oil trapped by the desiccant to the outside. The air dryer 2 delivers, to a system tank 4, dry compressed air that has been dried through the loading mode operation. The system tank 4 supplies the compressed air to systems such as brakes and suspensions. When the pressure in the system tank 4 reaches a predetermined value, the governor (not shown) of the air dryer 2 is activated so that control air is introduced to the air dryer 2 from the system tank 4. During the unloading mode operation, the control air opens an exhaust valve 2a. When the exhaust valve 2a of the air dryer 2 is opened, compressed air flows backward so that air that entrains oil as well as water (purge air) is delivered from an ejection port 2b.

In consideration of the burden on the environment, an oil separator 3 is provided at the ejection port 2b of the air dryer 2 in the air system. Specifically, the oil separator 3 is connected to the ejection port 2b of the air dryer 2 via an air dryer connection hose 20 to separate and recover oil and water from the purge air ejected during regeneration of the desiccant in the air dryer 2. That is, the vehicle is equipped with an oil separating system for a vehicle that has the oil separator 3.

The oil separator 3 is an impingement type oil separator. The oil separator 3 has a housing 3a, in which impingement members 3b are provided. Purge air entraining oil and water is caused to strike the impingement members 3b. The impingement type oil separator 3 causes purge air entraining oil and water to strike the impingement members 3b to separate the oil and water from the purge air, thereby ejecting clean air, from which oil and water have been separated, through an ejection port 3d. The liquid that contains oil and water separated from the purge air will hereafter be referred to as collected liquid in some cases. The oil separator 3 has a liquid storage portion 3c, which stores the separated and collected liquid.

The oil separator 3 becomes impossible to recover the collected liquid when the amount of the collected liquid that has been recovered reaches the volume of the liquid storage portion 3c. In such a case, the oil separator 3 restores the collected liquid, for example, to an engine 6, which is an external device. The oil separator 3 includes a liquid restoration device 10, which restores collected liquid to the external device. The liquid restoration device 10 is connected to the liquid storage portion 3c of the oil separator 3 via a liquid supply hose 30. The liquid supply hose 30 has a check valve 30a for allowing for only the flow from the oil separator 3 to the liquid restoration device 10. The oil separating system for a vehicle includes the oil separator 3 and the liquid restoration device 10.

The engine 6 has an oil pan 6a for storing lubricant. The lubricant stored in the oil pan 6a is circulated within the engine 6 and also circulated within the compressor 1.

The liquid restoration device 10 is connected to the oil pan 6a of the engine 6 via an engine connection hose 60 and discharges collected liquid stored in the liquid storage portion 3c to the oil pan 6a of the engine 6. In the present embodiment, the control air that has been introduced to the air dryer 2 is supplied to the liquid restoration device 10 via a control air supply hose 21. The control air serves as discharging air that discharges the collected liquid to the oil pan 6a of the engine 6.

Figure 2:
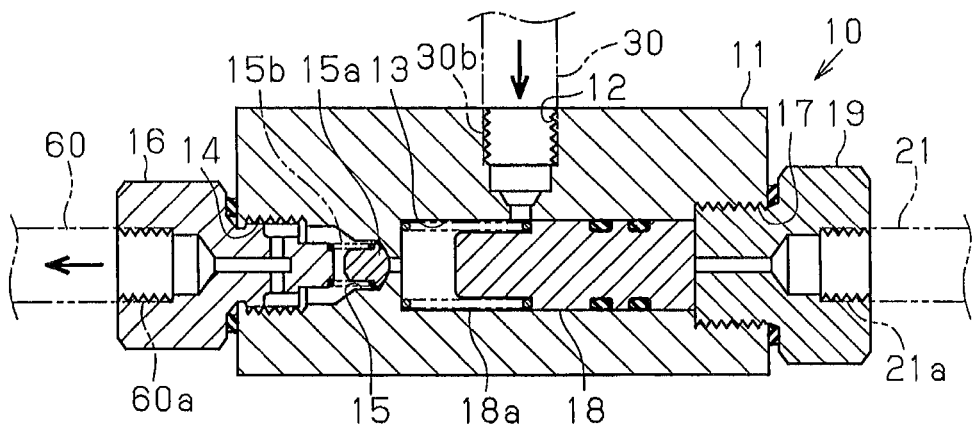
FIG. 2 is a cross-sectional view illustrating the liquid restoration device provided in the oil separator shown in FIG. 1.

As shown in FIG. 2, the liquid restoration device 10 includes a main body 11. The main body 11 has an inlet port 12, which is connected to the liquid storage portion 3c of the oil separator 3, a retaining portion 13 for retaining collected liquid that has flowed in through the inlet port 12, and a discharge port 14, which is connected to the engine 6 and through which collected liquid is discharged from the retaining portion 13. When the retaining portion 13 is pressurized, the liquid restoration device 10 discharges collected liquid through the discharge port 14. The liquid supply hose 30, which is connected to the liquid storage portion 3c of the oil separator 3, has a distal end 30b threaded to the inlet port 12. A check valve 15a is provided at a connecting portion 15 between the retaining portion 13 and the discharge port 14. The check valve 15a is urged by an urging spring 15b in a direction from the discharge port 14 toward the retaining portion 13. The check valve 15a only allows for flow from the retaining portion 13 to the discharge port 14. A first connecting member 16, which controls flow, is threaded to the discharge port 14. One end of the urging spring 15b is attached to the check valve 15a, and the other end of the urging spring 15b is attached to the first connecting member 16. Thus, the check valve 15a is installed in the main body 11 by attaching the first connecting member 16, which incorporates the check valve 15a, to the main body 11. The engine connection hose 60, which is connected to the oil pan 6a of the engine 6, has a distal end 60a threaded to the first connecting member 16.

The main body 11 has a supply port 17 for supplying compressed air to the retaining portion 13. The retaining portion 13 accommodates a piston 18 and an urging spring 18a. The piston 18 discharges collected liquid retained in the retaining portion 13 through the discharge port 14, and the urging spring 18a urges the piston 18 toward the supply port 17. A second connecting member 19 for squeezing the flow of compressed air is threaded to the supply port 17. The diameter of the inner through-passage of the second connecting member 19 decreases toward the retaining portion 13. The control air supply hose 21, which receives the control air from the oil separator 3, has a distal end 21a threaded to the second connecting member 19.

Figure 3:
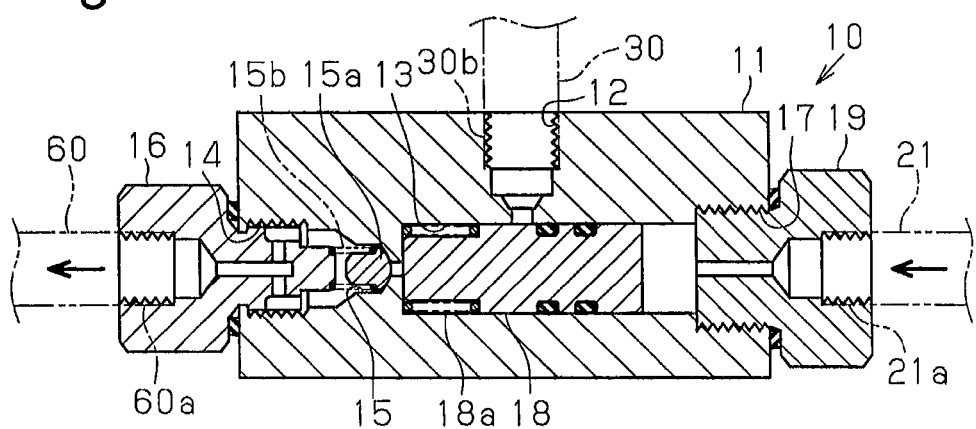
FIG. 3 is a block diagram illustrating an oil separator according to a second embodiment.

When compressed air is supplied from the supply port 17, the piston 18 is displaced toward the discharge port 14 as shown in FIG. 3 against the force of the urging spring 18a. The collected liquid in the retaining portion 13 is pressurized by the piston 18. When the piston 18 is displaced toward the discharge port 14, the inlet port 12 and the retaining portion 13 are disconnected from each other.

Operation of the air dryer 2 configured as described above will now be described with reference to FIGS. 1 to 3.

With reference to FIG. 1, the compressor 1 generates compressed air through operation of the engine 6 and delivers the compressed air to the air dryer 2. The air dryer 2 executes the loading mode operation to cause the compressed air from the compressor 1 to pass through the desiccant, thereby removing water and oil contained in the compressed air. The air dryer 2 then delivers the dry compressed air to the system tank 4. The system tank 4 supplies the compressed air to various systems. When the pressure in the system tank 4 reaches a predetermined value, and the governor introduces control air to the air dryer 2, the air dryer 2 executes the unloading mode operation for regenerating the desiccant. During the unloading mode operation, the air dryer 2 causes the compressed air to flow backward to deliver purge air entraining oil as well as water through the ejection port 2b. The purge air delivered through the ejection port 2b of the air dryer 2 is introduced to the oil separator 3 via the air dryer connection hose 20. The control air introduced to the air dryer 2 is used in the air dryer 2 and then supplied to the supply port 17 of the liquid restoration device 10 via the control air supply hose 21.

When receiving the purge air, which entrains oil and water, the oil separator 3 separates the oil and water from the purge air by causing the purge air to strike the impingement members 3b provided in the housing 3a. Clean air, from which oil and water have been separated, is ejected through the ejection port 3d. The oil and water separated from the purge air are recovered as collected liquid in the liquid storage portion 3c. The collected liquid stored in the liquid storage portion 3c of the oil separator 3 is supplied to the inlet port 12 of the liquid restoration device 10 via the liquid supply hose 30.

If the control air is ejected to the outside when the piston 18 is at the position close to the discharge port 14 as shown in FIG. 3, the piston 18 is no longer urged by the control air. The piston 18 is thus urged back toward the supply port 17 by the urging spring 18a.

When the piston 18 is displaced toward the supply port 17 as shown in FIG. 2, the retaining portion 13 is open to the inlet port 12 so that the inlet port 12 and the retaining portion 13 communicate with each other. Since the retaining portion 13 is sealed by the check valve 15a and the piston 18 (a sealed space), the displacement of the piston 18 toward the supply port 17 generates a negative pressure in the retaining portion 13, so that the collected liquid is drawn into the retaining portion 13 through the inlet port 12.

When the control air is supplied to the air dryer 2 in the above described manner, the control air is supplied to the second connecting member 19 of the supply port 17 of the liquid restoration device 10 via the control air supply hose 21. If the control air is supplied when the collected liquid is retained in the retaining portion 13, the control air displaces the piston 18 toward the discharge port 14. The collected liquid in the retaining portion 13 opens the check valve 15a of the connecting portion 15 and passes through the first connecting member 16 to be supplied to the oil pan 6a of the engine 6 via the engine connection hose 60. At this time, the check valve 30a, which is located in the liquid supply hose 30, prevents backflow from the inlet port 12 to the liquid storage portion 3c.

When the control air is ejected to the outside, the piston 18 is displaced toward the supply port 17. That is, each time the control air is supplied to the air dryer 2, in other words, each time the unloading mode operation (purging) is executed, the collected liquid is supplied to the oil pan 6a of the engine oil 6 from the liquid restoration device 10.

The collected liquid stored in the liquid storage portion 3c of the oil separator 3 is retained in the retaining portion 13 of the liquid restoration device 10. The control air supplied to the air dryer 2 is used as the discharging air to supply the collected liquid retained in the retaining portion 13 of the liquid restoration device 10 to the oil pan 6a of the engine 6, which is an external device. This reduces the number of times the collected liquid that has been separated from air and stored by the oil separator 3 is recovered.

The present embodiment has the following advantages.

(1) The collected liquid stored in the liquid storage portion 3c of the oil separator 3 is restored to the oil pan 6a of the engine 6 by the liquid restoration device 10. That is, the liquid restoration device 10 retains the collected liquid in the retaining portion 13 from the liquid storage portion 3c of the oil separator 3 via the inlet port 12, and pressurizes the retaining portion 13 to eject the collected liquid retained in the retaining portion 13 to the oil pan 6a of the engine 6 from the discharge port 14. Thus, the collected liquid stored in the liquid storage portion 3c of the oil separator 3 is restored to the oil pan 6a of the engine 6 by the liquid restoration device 10. This reduces the number of times the collected liquid that has been separated from air and stored by the oil separator 3 is recovered.

(2) Compressed air is supplied from the supply port 17 of the liquid restoration device 10 to displace the piston 18 in the retaining portion 13, so that the collected liquid retained in the retaining portion 13 is discharged to the oil pan 6a of the engine 6 through the discharge port 14. Thus, the collected liquid retained in the retaining portion 13 is reliably discharged to the oil pan 6a of the engine 6 by the piston 18, which is displaced by the compressed air.

(3) The piston 18 is displaced by the control air for controlling the exhaust valve 2a of the air dryer 2. Thus, the collected liquid can be discharged to the oil pan 6a of the engine 6 from the liquid restoration device 10 when the exhaust valve 2a of the air dryer 2 is activated, that is, when air entraining oil is introduced to the oil separator 3 from the air dryer 2. Accordingly, the discharge of the collected liquid is executed the same number of times as the ejection from the air dryer 2.

(4) The check valve 30a, which is arranged between the liquid storage portion 3c and the inlet port 12, opens only when collected liquid is delivered to the liquid restoration device 10. Thus, when the collected liquid is discharged from the discharge port 14, the check valve prevents the collected liquid is prevented from flowing backward to the liquid storage portion 3c from the inlet port 12.

(5) The collected liquid stored in the liquid storage portion 3c of the oil separator 3 is consumed in the oil pan 6a of the engine 6. This minimizes the number of times the collected liquid that has been separated from air and stored by the oil separator 3 is recovered.

Second Embodiment

An oil separator and an oil separating system for a vehicle according to a second embodiment will now be described with reference to FIG. 4. The oil separator of the present embodiment is different from that of the first embodiment in that, instead of the control air, system air is used as the discharging air. Differences from the first embodiment will mainly be discussed below.

Figure 4:
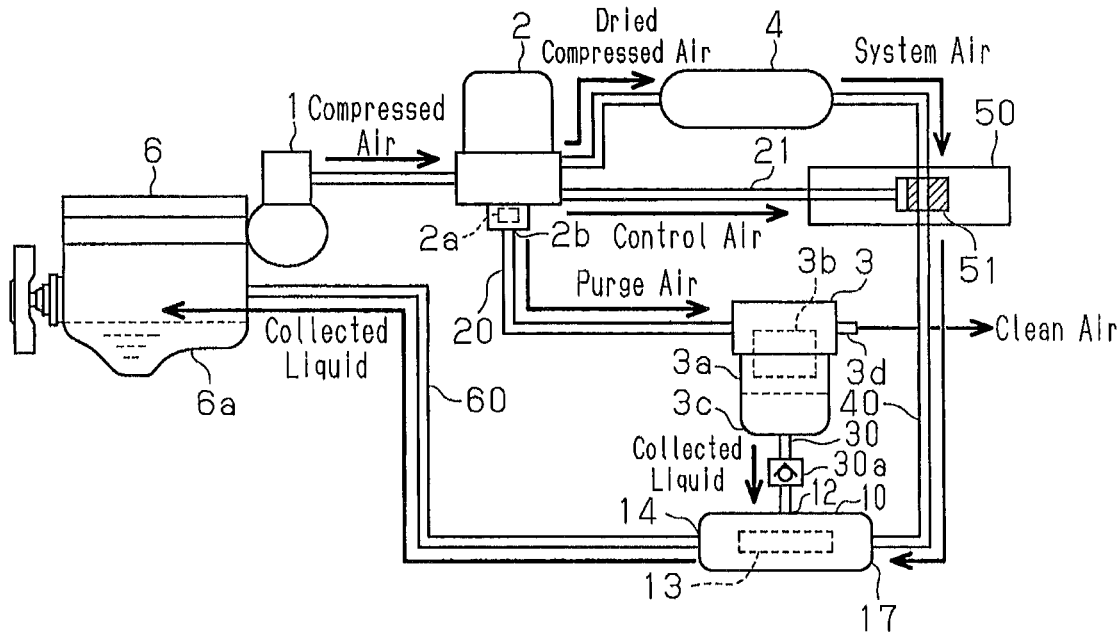
FIG. 4 is a block diagram illustrating an oil separator according to a third embodiment.

As shown in FIG. 4, the oil separator 3 is provided with a valve device 50, which is actuated by control air of the air dryer 2. The system air within the system tank 4 is supplied to the supply port 17 of the liquid restoration device 10 via a tank connection hose 40. The system air serves as the discharging air for discharging collected liquid to the oil pan 6a of the engine 6. The valve device 50 is located in the tank connection hose 40 between the system tank 4 and the liquid restoration device 10. The valve device 50 controls the supply of system air to the liquid restoration device 10.

When the control air is supplied to the valve device 50, a valve 51 is displaced to the communication side to open the tank connection hose 40. That is, the system air is supplied to the liquid restoration device 10. In contrast, when the control air is no longer supplied to the valve device 50, the valve 51 is displaced to the closing side to close the tank connection hose 40. That is, the system air is no longer supplied to the liquid restoration device 10.

Operation of the oil separator configured as described above will now be described with reference to FIG. 4. Descriptions of the same components as those of the first embodiment will be omitted, and operation of the liquid restoration device 10 and the valve device 50 will mainly be discussed.

If the system air is no longer supplied when the piston 18 is at the position close to the discharge port 14, the piston 18 is no longer urged by the system air. Thus, the piston 18 is urged toward the supply port 17 by the urging spring 18a.

When the control air is supplied to the air dryer 2 as described above, the control air is supplied to the valve device 50 via the control air supply hose 21. The valve 51 of the valve device 50 is displaced to the communication side, so that the tank connection hose 40 is open. The system air is then supplied to the second connecting member 19 of the supply port 17 of the liquid restoration device 10. If the system air is supplied when the collected liquid is retained in the retaining portion 13, the system air displaces the piston 18 toward the discharge port 14. The collected liquid in the retaining portion 13 opens the check valve 15a of the connecting portion 15 and passes through the first connecting member 16 to be supplied to the oil pan 6a of the engine 6 via the engine connection hose 60.

When the control air is ejected to the outside, the valve 51 of the valve device 50 is displaced to the closing side to close the tank connection hose 40. When the system air is no longer supplied, the piston 18 is displaced toward the supply port 17. In other words, each time the unloading mode operation (purging) is executed, the collected liquid is supplied to the oil pan 6a of the engine oil 6 from the liquid restoration device 10.

The collected liquid stored in the liquid storage portion 3c of the oil separator 3 is retained in the retaining portion 13 of the liquid restoration device 10. The control air supplied to the air dryer 2 is used to actuate the system air, which is the discharging air, to supply the collected liquid in the retaining portion 13 of the liquid restoration device 10 to the oil pan 6a of the engine 6, which is the external device. This reduces the number of times the collected liquid that has been separated from air and stored by the oil separator 3 is recovered.

The present embodiment achieves the following advantage in addition to the advantages (1), (2), (4), and (5) of the first embodiment.

(6) The control air, which controls the exhaust valve 2a of the air dryer 2, supplies the system air of the system tank 4 into the retaining portion 13 to displace the piston 18. Thus, compared to a configuration in which the piston 18 is driven solely by the control air, the piston 18 is reliably displaced by a great force. Also, when air entraining oil is introduced to the oil separator 3 from the air dryer 2, the collected liquid can be discharged to the oil pan 6a of the engine 6 from the liquid restoration device 10. Thus, the discharge of the collected liquid is performed the same number of times as the discharge of the air dryer 2.

Third Embodiment

An oil separator and an oil separating system for a vehicle according to a third embodiment will now be described with reference to FIG. 5. The oil separator of the present embodiment is different from that of the first embodiment in that no piston is provided in the liquid restoration device, and that collected liquid is discharged only by air. Differences from the first embodiment will mainly be discussed below.

Figure 5:
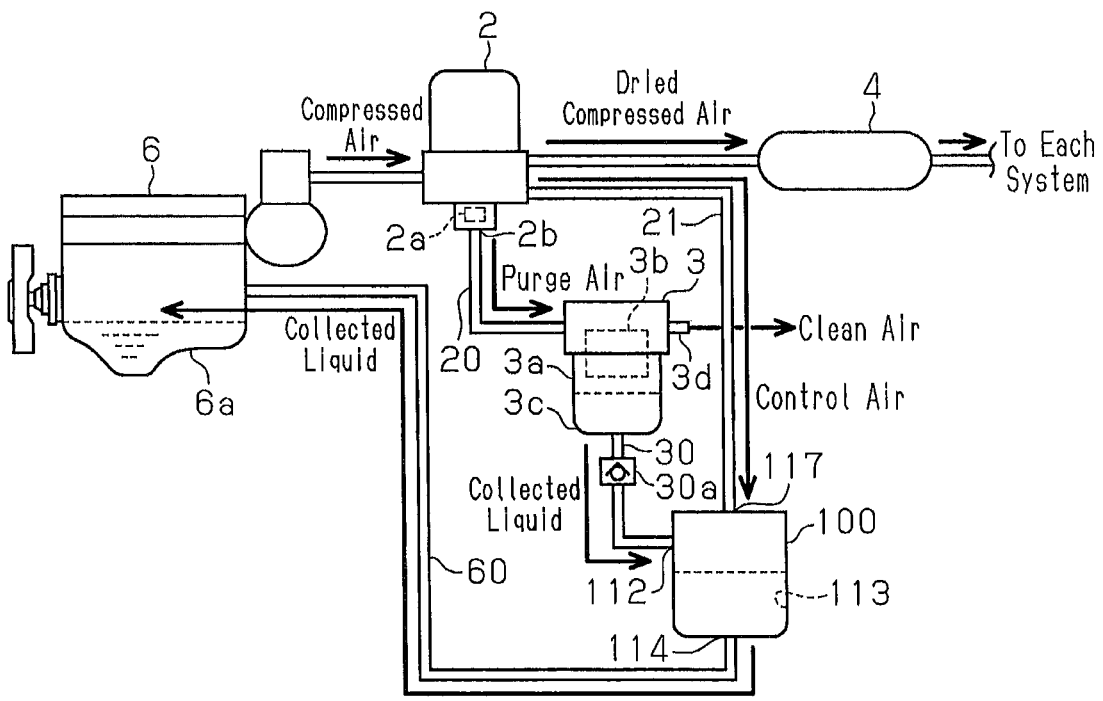
FIG. 5 is a cross-sectional view illustrating the liquid restoration device provided in the oil separator shown in FIG. 4.

As shown in FIG. 5, an inlet port 112 of a liquid restoration device 100 is connected to the liquid storage portion 3c of the oil separator 3 via the liquid supply hose 30. The liquid supply hose 30 has a check valve 30a for allowing for only the flow from the oil separator 3 to the liquid restoration device 100. The discharge port 114 of the liquid restoration device 100 is connected to the oil pan 6a of the engine 6 via an engine connection hose 60 and discharges collected liquid stored in the liquid storage portion 3c to the oil pan 6a of the engine 6. The control air introduced to the air dryer 2 is also supplied to the supply port 117 of the liquid restoration device 100 via the control air supply hose 21. The liquid restoration device 100 is a closed container to which only the liquid supply hose 30, the engine connection hose 60, and the control air supply hose 21 are communicated with.

The liquid restoration device 100 receives collected liquid from the liquid storage portion 3c of the oil separator 3 via the liquid supply hose 30. The liquid restoration device 100 has a retaining portion 313, which receives the control air via the control air supply hose 21. When the retaining portion 113 is pressurized by the control air, the liquid restoration device 100 discharges collected liquid through a discharge port 114.

Operation of the oil separator configured as described above will now be described with reference to FIG. 5. Descriptions of the same components as those of the first embodiment will be omitted, and operation of the liquid restoration device 100 will mainly be discussed.

As shown in FIG. 5, the oil and water separated from the purge air are recovered as collected liquid in the liquid storage portion 3c. The collected liquid stored in the liquid storage portion 3c of the oil separator 3 is also supplied to the retaining portion 113 of the liquid restoration device 100 via the liquid supply hose 30. When control air is supplied to the air dryer 2, the control air is supplied to the liquid restoration device 100 via the control air supply hose 21. If the control air is supplied when the retaining portion 113 retains collected liquid, the interior of the retaining portion 113 is pressurized by the control air. The pressurization discharges the collected liquid from the discharge port 114, and the collected liquid is supplied to the oil pan 6a of the engine 6 via the engine connection hose 60. At this time, the check valve 30a, which is located in the liquid supply hose 30, prevents backflow from the retaining portion 113 to the liquid storage portion 3c.

Also, each time the control air is supplied to the air dryer 2, in other words, each time the unloading mode operation (purging) is executed, the collected liquid is supplied to the oil pan 6a of the engine oil 6 from the liquid restoration device 100.

The collected liquid stored in the liquid storage portion 3c of the oil separator 3 is retained in the retaining portion 113 of the liquid restoration device 100. The control air supplied to the air dryer 2 is used as the discharging air to supply the collected liquid retained in the retaining portion 113 of the liquid restoration device 100 to the oil pan 6a of the engine 6, which is an external device. This reduces the number of times the collected liquid that has been separated from air and stored by the oil separator 3 is recovered.

The present embodiment achieves the following advantages in addition to the advantages (1), (2), and (5) of the first embodiment.

(7) The control air is supplied from the supply port 117 of the liquid restoration device 100, so that the collected liquid retained in the retaining portion 113 is discharged to the oil pan 6a of the engine 6 through the discharge port 114. Thus, no actuating structure such as a piston is required, which simplifies the configuration.

(8) The control air, which controls the exhaust valve 2a of the air dryer, discharges the collected liquid in the retaining portion 113. Thus, the collected liquid can be discharged to the oil pan 6a of the engine 6 from the liquid restoration device 100 when the exhaust valve 2a of the air dryer 2 is activated, that is, when air entraining oil is introduced to the oil separator 3 from the air dryer 2. Accordingly, the discharge of the collected liquid is executed the same number of times as the ejection from the air dryer 2.

Fourth Embodiment

An oil separator and an oil separating system for a vehicle according to a fourth embodiment will now be described with reference to FIG. 6. The oil separator of the present embodiment is different from that of the third embodiment in that, instead of the control air, air ejected by the oil separator (clean air) is used. Differences from the third embodiment will mainly be discussed below.

Figure 6:
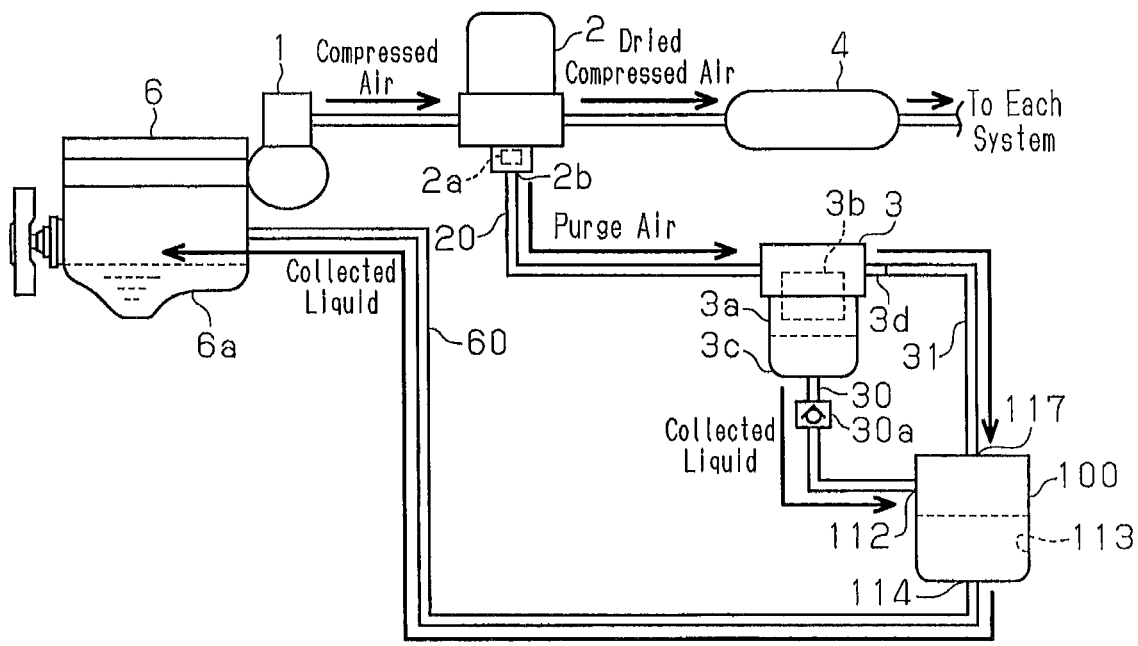
FIG. 6 is a block diagram illustrating an oil separator according to a fourth embodiment.

As shown in FIG. 6, the supply port 117 of the liquid restoration device 100 receives clean air ejected by the oil separator 3 via a clean air supply hose 31. The liquid restoration device 100 is a closed container to which only the liquid supply hose 30, the engine connection hose 60, and the clean air supply hose 31 are connected.

The liquid restoration device 100 receives collected liquid from the liquid storage portion 3c of the oil separator 3 via the liquid supply hose 30. The liquid restoration device 100 has a retaining portion 113, which receives the clean air via the clean air supply hose 31. When the retaining portion 113 is pressurized by the clean air, the liquid restoration device 100 discharges collected liquid through a discharge port 114.

Operation of the oil separator configured as described above will now be described with reference to FIG. 6. Descriptions of the same components as those of the first embodiment will be omitted, and operation of the liquid restoration device 100 will mainly be discussed.

As shown in FIG. 6, the oil and water separated from the purge air are recovered as collected liquid in the liquid storage portion 3c. The collected liquid stored in the liquid storage portion 3c of the oil separator 3 is supplied to the retaining portion 113 of the liquid restoration device 100 via the liquid supply hose 30. When the purge air is introduced to the oil separator 3 from the air dryer 2, clean air is supplied to the liquid restoration device 100 from the oil separator 3 via the clean air supply hose 31. If the clean air is supplied when the retaining portion 113 retains collected liquid, the interior of the retaining portion 113 is pressurized by the clean air. The pressurization discharges the collected liquid from the discharge port 114, and the collected liquid is supplied to the oil pan 6a of the engine 6 via the engine connection hose 60. At this time, the check valve 30a, which is located in the liquid supply hose 30, prevents backflow from the retaining portion 113 to the liquid storage portion 3c.

Also, each time the clean air is ejected from the oil separator 3, in other words, each time the unloading mode operation (purging) is executed, the collected liquid is supplied to the oil pan 6a of the engine oil 6 from the liquid restoration device 100.

The collected liquid stored in the liquid storage portion 3c of the oil separator 3 is retained in the retaining portion 113 of the liquid restoration device 100.

The clean air supplied from the oil separator 3 is used as the discharging air to pressurize the retaining portion 113, so that the collected liquid retained in the retaining portion 113 of the liquid restoration device 100 is supplied to the oil pan 6a of the engine 6, which is an external device. This reduces the number of times the collected liquid that has been separated from air and stored by the oil separator 3 is recovered.

The present embodiment achieves the following advantage in addition to the advantages (5) of the first embodiment and the advantage (7) of the third embodiment.

(9) The clean air ejected by the oil separator 3 is used to discharge the collected liquid from the retaining portion 113. Therefore, the discharge of the collected liquid is performed the same number of times as the ejection of the clean air from the oil separator 3.

Fifth Embodiment

An oil separator and an oil separating system for a vehicle according to a fifth embodiment will now be described with reference to FIG. 7. The oil separator of the present embodiment is different from that of the first embodiment in that the retaining portion is pressurized through heating, without using discharging air. Differences from the first embodiment will mainly be discussed below.

Figure 7:
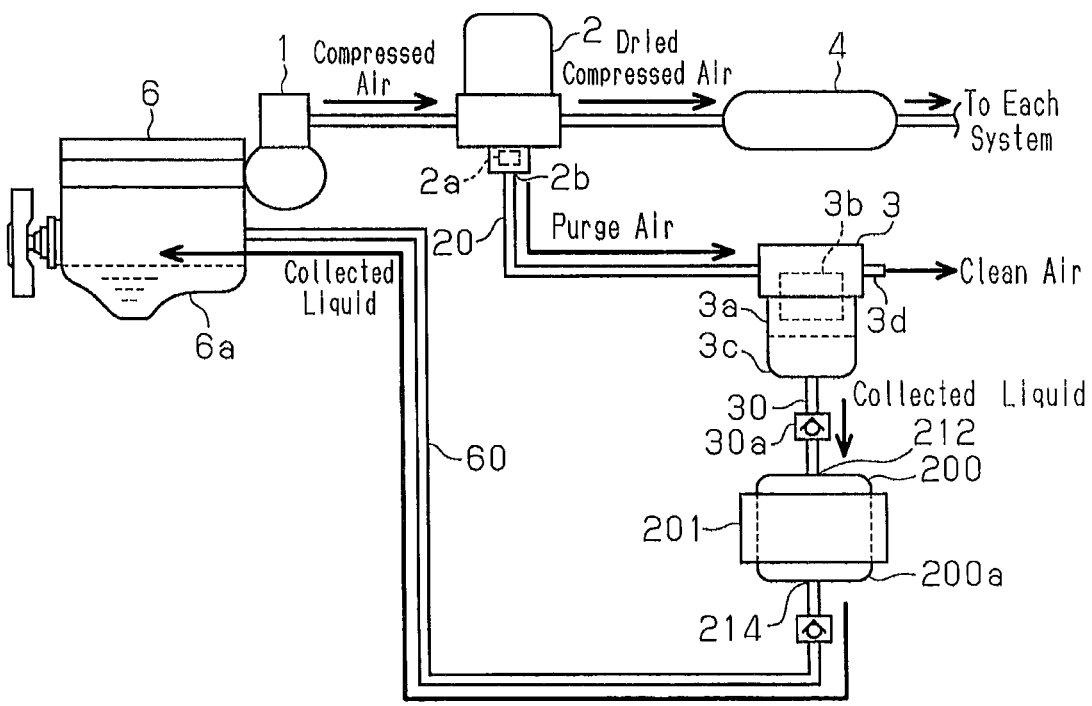
FIG. 7 is a block diagram illustrating an oil separator according to a fifth embodiment.

As shown in FIG. 7, an inlet port 212 of a liquid restoration device 200 is connected to the liquid storage portion 3c of the oil separator 3 via the liquid supply hose 30. The liquid supply hose 30 has a check valve 30a for allowing for only the flow from the oil separator 3 to the liquid restoration device 200. The discharge port 214 of the liquid restoration device 200 is connected to the oil pan 6a of the engine 6 via an engine connection hose 60 and discharges collected liquid stored in the liquid storage portion 3c to the oil pan 6a of the engine 6. The liquid restoration device 200 is a closed container 200a, to which only the liquid supply hose 30 and the engine connection hose 60 are connected. The container 200a corresponds to the retaining portion. The liquid restoration device 200 includes a heating portion 201 for heating the container 200a. In the liquid restoration device 200, the container 200a is heated by the heating portion 201, so that the collected liquid in the container 200a is pressurized.

The liquid restoration device 200 receives collected liquid from the liquid storage portion 3c of the oil separator 3 via the liquid supply hose 30. When the container 200a is pressurized by the heating portion 201, the liquid restoration device 100 discharges the collected liquid through a discharge port 214.

Operation of the oil separator configured as described above will now be described with reference to FIG. 7. Descriptions of the same components as those of the first embodiment will be omitted, and operation of the liquid restoration device 100 will mainly be discussed.

As shown in FIG. 7, the oil and water separated from the purge air are recovered as collected liquid in the liquid storage portion 3c. The collected liquid stored in the liquid storage portion 3c of the oil separator 3 is supplied to the container 200a of the liquid restoration device 200 via the liquid supply hose 30. When the collected liquid retained in the container 200a is heated by the heating portion 201, the interior of the container 200a is pressurized. The pressurization discharges the collected liquid from the discharge port 214, and the collected liquid is supplied to the oil pan 6a of the engine 6 via the engine connection hose 60. At this time, the check valve 30a, which is located in the liquid supply hose 30, prevents backflow from the container 200a to the liquid storage portion 3c.

Since the collected liquid is supplied to the oil pan 6a of the engine 6 from the liquid restoration device 200 through heating by the heating portion 201, the supply of the collected liquid can be controlled by controlling the heating.

The collected liquid stored in the liquid storage portion 3c of the oil separator 3 is retained in the container 200a of the liquid restoration device 200. Then, the heating portion 201 heats the collected liquid to pressurize the interior of the container 200a, so that the collected liquid stored in the container 200a of the liquid restoration device 200 is supplied to the oil pan 6a of the engine 6, which is an external device. This reduces the number of times the collected liquid that has been separated from air and stored by the oil separator 3 is recovered.

The present embodiment achieves the following advantage in addition to the advantages (1), (4), and (5) of the first embodiment.

(10) The collected liquid in the container 200a of the liquid restoration device 200 expands by being heated, so that the interior of the container 200a is pressurized. This discharges the collected liquid to the oil pan 6a of the engine 6 from the liquid restoration device 200. This allows the collected liquid to be discharged to the oil pan 6a of the engine 6 from the liquid restoration device 200 solely by the heating portion 201, without providing a supply passage for supplying compressed air to the container 200a.

The above described embodiments may be modified as follows.

In the above-illustrated embodiments, the inlet port 12 and the liquid supply hose 30 are connected through threading. However, the connection may be achieved by other structure such as snap-fitting.

In the above-illustrated embodiments, the discharge port 14 and the first connecting member 16 are connected through threading. However, the connection may be achieved by other structure such as snap-fitting.

In the above-illustrated embodiments, the first connecting member 16 and the engine connection hose 60 are connected through threading. However, the connection may be achieved by other structure such as snap-fitting.

In the above-illustrated embodiments, the first connecting member 16 is arranged between the discharge port 14 and the engine connection hose 60. However, the discharge port 14 and the engine connection hose 60 may be connected directly to each other.

In the above-illustrated embodiments, the supply port 17 and the second connecting member 19 are connected through threading. However, the connection may be achieved by other structure such as snap-fitting.

In the above-illustrated embodiments, the second connecting member 19 and the control air supply hose 21 are connected through threading. However, the connection may be achieved by other structure such as snap-fitting.

In the above-illustrated embodiments, the second connecting member 19 is arranged between the supply port 17 and the control air supply hose 21. However, the supply port 17 and the control air supply hose 21 may be connected directly to each other.

In the first and second embodiments, the liquid supply hose 30 is provided with the check valve 30a. However, the check valve 30a may be omitted if the piston 18 is capable of preventing backflow.

In the above-illustrated embodiments, the collected liquid is restored to the oil pan 6a of the engine, which is an external device. However, the collected liquid may be restored to other external device that uses oil, such as the compressor 1.

Figure 8:
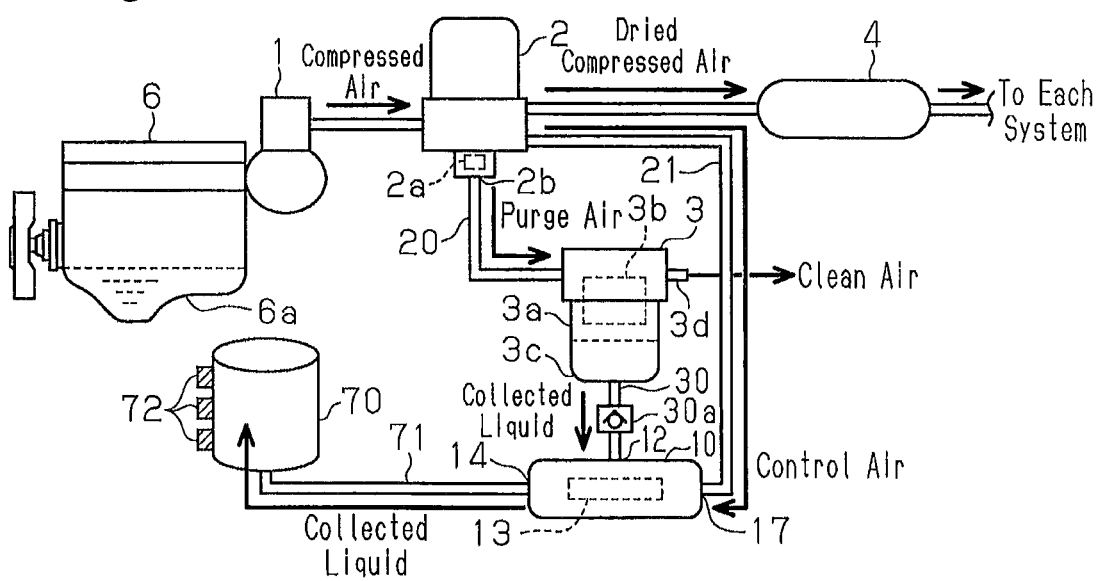
FIG. 8 is a block diagram illustrating an oil separator according to a modification.

In the above-illustrated embodiments, the collected liquid is restored to the external device that uses oil. However, the collected liquid may be restored to an external device that uses no oil. For example, in the example shown in FIG. 8, the liquid restoration device 10 is connected to a tank 70, which is an external device, via a tank connection hose 71. The tank 70 is fixed, for example, to a side guard 72. Thus, the collected liquid stored in the liquid storage portion 3c of the oil separator 3 is restored to the tank 70 by the liquid restoration device 10. The collected liquid stored in the tank 70 is periodically disposed before the tank 70 is full.

In the above-illustrated embodiments, the oil separator 3 is provided separately from and connected to the liquid restoration devices 10, 100, 200 via the liquid supply hose 30. However, the oil separator 3 and each of the liquid restoration devices 10, 100, 200 may be configured as an integral unit.

Further, each of the liquid restoration devices 10, 100, 200 may be incorporated in the external device.

DESCRIPTION OF THE REFERENCE NUMERALS

1 . . . Compressor, 2 . . . Air Dryer, 2a . . . Exhaust Valve, 2b. . . Ejection Port, 3 . . . Oil Separator, 3a . . . Housing, 3b . . . Impingement Members, 3c . . . Liquid Storage Portion, 3d . . . Ejection Port, 4 . . . System Tank, 6 . . . Engine, 6a . . . Oil Pan, 10 . . . Liquid Restoration Device, 11 . . . Main Body, 12 . . . Inlet Port, 13 . . . Retaining Portion, 14 . . . Discharge Port, 15 . . . Connecting Portion, 15a . . . Check Valve, 15b . . . Urging Spring, 16 . . . First Connecting Member, 17 . . . Supply Port, 18 . . . Piston, 18a . . . Urging Spring, 19 . . . Second Connecting Member, 20 . . . Air Dryer Connection Hose, 21 . . . Control Air Supply Hose, 21a . . . Distal End, 30 . . . Liquid Supply Hose, 30a . . . Check Valve, 30b . . . Distal End, 31 . . . Clean Air Supply Hose, 40 . . . Tank Connection Hose, 50 . . . Valve Device, 51 . . . Valve, 60 . . . Engine Connection Hose, 60a . . . Distal End, 70 . . . Tank, 71 . . . Tank Connection Hose, 72 . . . Side Guard, 100 . . . Liquid Restoration Device, 112 . . . Inlet Port, 113 . . . Retaining Portion, 114 . . . Discharge Port, 117 . . . Supply Port, 200 . . . Liquid Restoration Device, 200a . . . Container, 201 . . . Heating Portion, 212 . . . Inlet Port, 214 . . . Discharge Port.

The invention claimed is:

1. An oil separator comprising:
a housing; and
an impingement member arranged in the housing,
wherein the oil separator is configured to introduce purge air containing oil from an air dryer into the housing and cause the purge air to strike the impingement member to separate the oil from the introduced purge air, thereby recovering the oil into a liquid storage portion, the air dryer comprising an exhaust valve and being configured to dry compressed air,
wherein the oil separator further comprises a liquid restoration device, which restores, to an external device, collected liquid containing the oil that has been separated from the purge air and recovered,
wherein the liquid restoration device includes
an inlet port connected to the liquid storage portion,
a retaining portion, which retains the collected liquid that has flowed in through the inlet port, and
a discharge port connected to the external device,
a supply port, which supplies, to the retaining portion, control air that controls the exhaust valve of the air dryer, and
wherein the liquid restoration device pressurizes the retaining portion to discharge the retained collected liquid to the external device through the discharge port.

2. The oil separator according to claim 1, wherein the liquid restoration device includes
a piston arranged in the retaining portion, and
an urging spring, which urges the piston toward the supply port, wherein the piston is displaced by the control air supplied from the supply port, thereby discharging the collected liquid retained in the retaining portion to the external device through the discharge port.

3. The oil separator according to claim 1,
wherein the liquid restoration device uses pressure of the control air supplied from the supply port to discharge the collected liquid retained in the retaining portion to the external device through the discharge port.

4. The oil separator according to claim 1, wherein the liquid restoration device includes a heating portion, which heats the collected liquid in the retaining portion, and
wherein the collected liquid in the retaining portion is expanded by being heated, so that the retaining portion is pressurized.

5. The oil separator according to claim 1, further comprising a check valve arranged between the liquid storage portion and the inlet port,
wherein the check valve is opened only when causing the collected liquid to flow into the liquid restoration device.

6. The oil separator according to claim 1, wherein the external device uses oil.

7. An oil separating system for a vehicle, comprising:
an oil separator according to claim 1.

* * * * *